(12) United States Patent
Brown et al.

(10) Patent No.: US 7,392,243 B2
(45) Date of Patent: Jun. 24, 2008

(54) USING PERMANENT IDENTIFIERS IN DOCUMENTS FOR CHANGE MANAGEMENT

(75) Inventors: David C. Brown, Redmond, WA (US); Zhanjia Yang, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 476 days.

(21) Appl. No.: 10/970,748

(22) Filed: Oct. 20, 2004

(65) Prior Publication Data

US 2006/0085402 A1    Apr. 20, 2006

(51) Int. Cl.
G06F 17/30    (2006.01)

(52) U.S. Cl. ............................. 707/3; 711/117

(58) Field of Classification Search ........................ None
See application file for complete search history.

(56) References Cited

U.S. PATENT DOCUMENTS

| | | | |
|---|---|---|---|
| 6,585,777 B1 * | 7/2003 | Ramaley et al. ............. | 715/513 |
| 6,674,924 B2 * | 1/2004 | Wright et al. ................ | 382/306 |
| 6,848,078 B1 * | 1/2005 | Birsan et al. ................. | 715/511 |
| 6,907,420 B2 * | 6/2005 | Gensel ......................... | 707/1 |
| 6,959,416 B2 * | 10/2005 | Manning et al. ............. | 715/513 |
| 6,963,930 B2 * | 11/2005 | Halpert et al. ............... | 709/246 |
| 7,080,083 B2 * | 7/2006 | Kim et al. .................... | 707/100 |

* cited by examiner

Primary Examiner—Hosain T Alam
Assistant Examiner—Azam Cheema
(74) Attorney, Agent, or Firm—Workman Nydegger

(57) ABSTRACT

Described is a system and method by which a unique and permanent identifier is added to tags in hierarchically-arranged data (e.g., an XML or XAML file) by a first tool. The data with the unique and permanent identifiers is processed by a second tool into a flat file of key-value pairs, with the key being constructed from the identifier and attribute names, and the value comprising the corresponding value for that attribute. When the flat file from the new data file is compared to a flat file from an earlier version of the file, a standard merge program is able to better detect the differences, including differences caused by complex edits. The comparison is more granular than it would be if simply comparing the hierarchically-arranged file versions, thereby providing significant benefits in localization and other version tracking scenarios.

20 Claims, 7 Drawing Sheets

USING PERMANENT IDENTIFIERS IN DOCUMENTS FOR CHANGE MANAGEMENT

FIELD OF THE INVENTION

The invention relates generally to clustered computing nodes, and more particularly to handling failures of a node of a cluster.

BACKGROUND

Localization is directed towards the concept of adapting an application program to a particular culture. In many situations, teams of translators spend significant time figuring out what changes need to be made to a program, typically to the program's user interface. The most common example of changing a user interface is translating text from one language to another, however other types of adaptations need to be made. For example, a color scheme that may be fine in one culture may not be appropriate for another. Other types of changes also need to be made.

Operating systems and components allow user interfaces to be built with hierarchically-arranged data, particularly via XML (extensible markup language) files, and in Microsoft Corporation's XAML (extensible application markup language). As each such file changes over the development life of a project, there is a need to identify the changes that are made to the file. For example, the above-described localization of a project is a long process that needs to happen in parallel with project development, and thus begins long before the project is complete. As changes are made, synchronization is necessary to track every change to the un-localized files, so that the change will be reflected in the corresponding versions of the localized files. While existing text-based difference programs provide some assistance to the translation teams, this does not work sufficiently well enough in many situations. For example, if a sequence of (e.g., XML) tagged objects in the un-localized XML is changed such that both the content (e.g., text or color) and the ordering and/or number of objects is changed (e.g., buttons are reordered, removed or added), then contemporary difference program only detect that the whole sequence has changed, causing the entire sequence to require re-localization, which is a very expensive process.

What is needed is a way to track changes to data files so that a reduced amount of re-localization is required. Complex change edits, such as changes made to both the content and the ordering/number of a sequence of tags, should not require that the entire sequence be re-localized.

SUMMARY OF THE INVENTION

Briefly, the present invention is directed towards a system and method by which a unique and permanent identifier is added to tags in hierarchically-arranged data, and tools applied, which without changing the identifiers, process the data into an appropriate format such that existing merge programs have enough information to recognize complex edits, such as both content changes to a tag's attributes and re-orderings, insertions and/or deletions of tags.

To this end, a first tool is provided that walks through any hierarchically-arranged (e.g., XML) file and permanently adds unique identifiers to every appropriate tag that does not already have an identifier. A second tool then uses the permanent identifiers to track changes. To this end, the identifiers may be use to flatten the XML file to key-value pairs, with the key being constructed from the identifier and attribute names, and textual content containing a simple syntax to reference nested subtrees.

Because the identifiers should be unique at least between the file versions being compared, these tools may also report duplicate use of identifiers as an error. When used in localization, the insertion tool 204 that adds the unique identifiers may recognize tags that have no information that needs to be localized, and omit adding identifiers to such tags.

When the flat file constructed from the new XML file is compared to a maintained copy of the flat file previously constructed from an earlier version of the file, an existing merge program (which is a record structured file, key based comparison) detects the differences, including those that were caused by complex edits. For example, records may exist for each change, flagged with deleted, new or changed content flags.

Other advantages will become apparent from the following detailed description when taken in conjunction with the drawings, in which:

DETAILED DESCRIPTION

Exemplary Operating Environment

Figure 1:
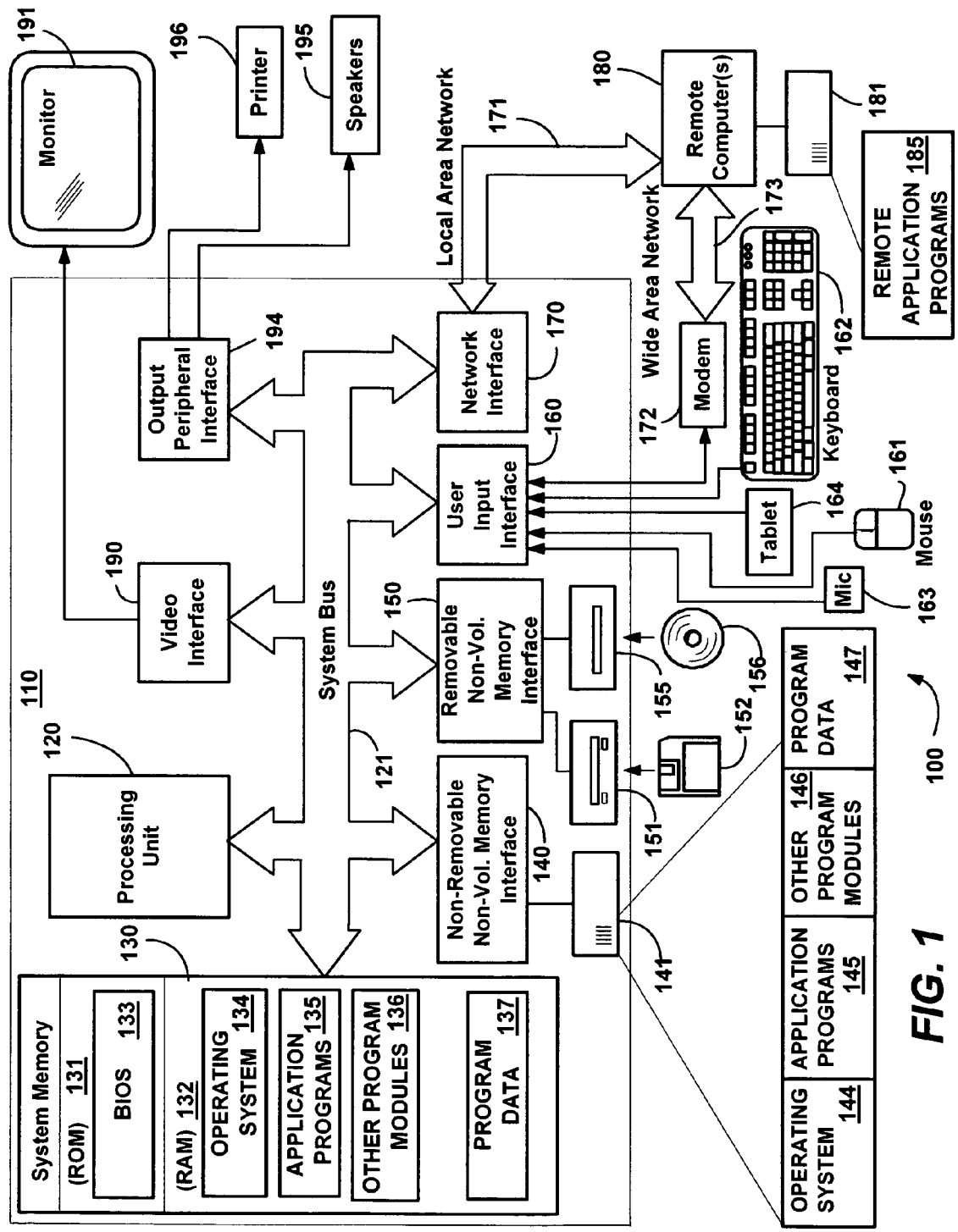
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Permanent Identifiers for Change Management

The present invention is generally directed towards a system and method by which an existing merge tool is essentially guided to find differences that result from changes to hierarchically arranged files such as XML and XAML files. As will be understood, numerous ways to implement the present invention are feasible, and only some of the alternatives are described herein. For example, the present invention may provide benefits with files that are not hierarchically arranged. Further, while the present invention is generally described with an architecture that helps locate changes for purposes of localization, other applications of the present invention are possible, such as in source code management situations. As such, the present invention is not limited to any particular examples used herein, but rather may be used various ways that provide benefits and advantages in computing in general.

Figure 2:
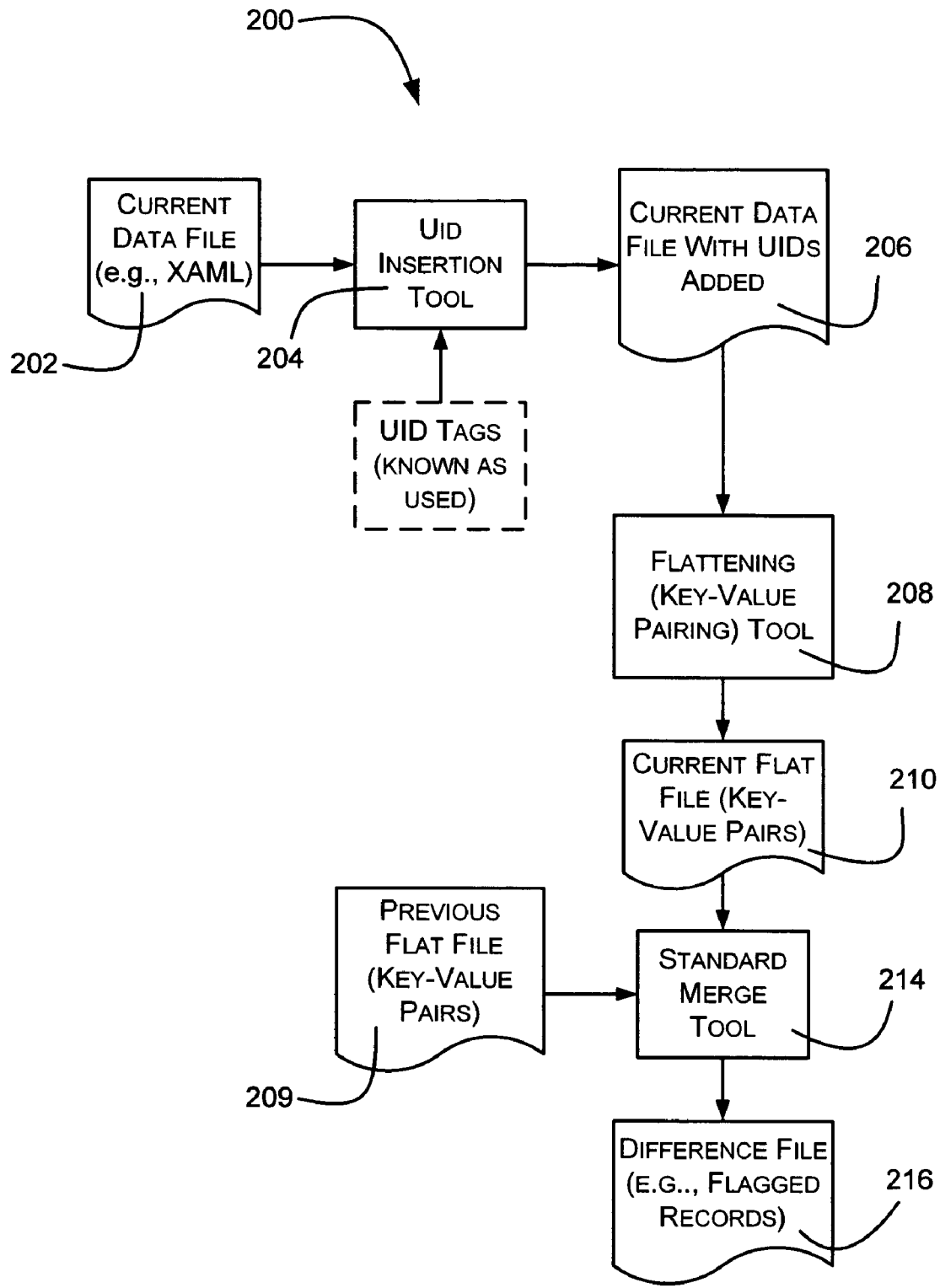
FIG. 2 is a block diagram generally representing an architecture having various tools for inserting UIDs into hierarchically-arranged data files and flattening those files into key-value pairs for comparison, in accordance with various aspects of the present invention.

FIG. 2 shows a general architecture 200. In FIG. 2, a data file 202 contains changes relative to a previous version of the file. The file may be a XAML-formatted file, such as one that contains (in a second V2 version) the following text for putting four buttons into a panel to be displayed on a user interface:

```
<FlowPanel . . . >
    <Button Background="Red">Stop</Button>
    <Button Background="Yellow">Caution</Button>
    <Button Background="Blue">Cancel</Button>
    <Button Background="Green">Go</Button>
</FlowPanel>
```

As can be seen, in this second version, if this XAML is executed, four buttons are drawn in a panel, namely ones with red, yellow, blue and green backgrounds, respectively.

Consider the previous version V1 of that same file, which had only three buttons with different background colors, and, relative to the second version, an ordering such that chartreuse appeared directly after bright straw:

```
<FlowPanel . . . >
    <Button Background="Ruddy">Stop</Button>
    <Button Background="Bright Straw">Caution</Button>
    <Button Background="Chartreuse">Go</Button>
</FlowPanel>
```

As can be readily appreciated, existing text-based difference tools will not work well, even with this simple example, because what occurred is that not only did the background colors change, but a new (blue-background) button was inserted into the sequence. In a difference comparison, the chartreuse button would likely be compared against the blue button, even though the blue button was actually inserted as a new string and the chartreuse button should be compared against the green button of the previous version. While the above-example is relatively straightforward, more complex examples shown below significantly confuse difference comparison programs, and indeed, some would only be able to tell that all four buttons changed without being able to distinguish what actually occurred.

In accordance with an aspect of the present invention, a UID insertion tool 204 is provided that adds a unique identifier (UID) as an attribute to each appropriate tag, which will then later result in a file format that does not confuse existing merge programs. Although the UIDs that are attached need only be unique among versions that are to be compared, that is, no UID will be duplicated on a tag. Significantly, the insertion tool only inserts UIDs on tags that do not have one already; once a UID is attached it becomes permanent and will remain with the tag as long as that tag remains in the file and any future versions of that file. Note that the insertion tool 204 knows which IDs are used and thus which are available, such as by scanning the previous version, and will not use these when inserting UIDs, resulting in a data file with UIDs added, as labeled 206 in FIG. 2.

Returning to the previous example, version 1 of the file with UIDs looks like the following; note that in this example implementation, the UID for a button includes the text "Button" with a unique number appended thereto, but of course could be any unique value combined in any way:

```
<FlowPanel . . . >
    <Button UID="Button1" Background="Ruddy">Stop</Button>
    <Button UID="Button2" Background="Bright Straw">
    Caution</Button>
    <Button UID="Button3" Background="Chartreuse">Go</Button>
</FlowPanel>
```

Version 2 (the current version) of the file with UIDs added, shown in FIG. 2 as the file labeled 206, looks like the following:

```
<FlowPanel . . . >
    <Button UID="Button1" Background="Red">Stop</Button>
    <Button UID="Button2" Background="Yellow">
    Caution</Button>
    <Button UID="Button4" Background="Blue">Cancel</Button>
    <Button UID="Button3" Background="Green">Go</Button>
</FlowPanel>
```

In accordance with another aspect of the present invention, the data file with the UIDs added is flattened by a flattening tool 208 into key-value pairs with the key being constructed from the identifier and attribute names. For example, the current version of the file is flattened into:

| | |
|---|---|
| Button1.Background | Red |
| Button1.$Content | Stop |
| Button2.Background | Yellow |
| Button2.$Content | Caution |
| Button4.Background | Blue |
| Button4.$Content | Cancel |
| Button3.Background | Green |
| Button3.$Content | Go |

This flattened, key value pair file is represented in FIG. 2 as the file labeled 210. Note that this example is not particularly hierarchical, and thus the flattening not readily apparent. However, consider the following XAML, in which the text tags have added UID attributes:

```
<Text UID="Text5" FontFamily="Arial" Foreground="Blue">
    Some text here
</Text>
<Text UID="Text6" FontFamily="Arial" Foreground="Red">
    Some other text
</Text>
```

When flattened, the following key value pair file is provided:

| | |
|---|---|
| Text5.FontFamily | Arial |
| Text5.Foreground | Blue |
| Text5.$Content | Some text here |
| Text6.FontFamily | Arial |
| Text6.Foreground | Red |
| Text6.$Content | Some other text |

Returning to the original example, if the previous version was likewise flattened into a file 212 of key-value pairs with a permanent UID as part of the key, the two flattened files are in the following tables:

TABLE 1

Version 1 Flat File

| | |
|---|---|
| Button1.Background | Ruddy |
| Button1.$Content | Stop |
| Button2.Background | Bright Straw |
| Button2.$Content | Caution |
| Button3.Background | Chartreuse |
| Button3.$Content | Go |

TABLE 2

Version 2 Flat File

| | |
|---|---|
| Button1.Background | Red |
| Button1.$Content | Stop |
| Button2.Background | Yellow |
| Button2.$Content | Caution |
| Button4.Background | Blue |
| Button4.$Content | Cancel |
| Button3.Background | Green |
| Button3.$Content | Go |

In this format, a standard merge comparison tool 214 is able to recognize the changes on a more granular basis, because of the key. The result is an output file (e.g., difference file 216), such as flagged records of added, deleted and changed items, which a localization team or the like may use to more quickly determine what has changed.

Note that because the identifiers should be unique within the file and between the file versions being compared, these tools 204 and 208 may also report duplicate use of identifiers as an error. Further, when used in localization, the insertion tool 204 that adds the unique identifiers may recognize tags that have no information that needs to be localized, and omit adding identifiers to such tags. Still further, note that the UID insertion tool and flattening tool may be individual tools or tools combined into a single entity, and used by the developer team or the localization team as desired.

When flattening nested buttons, multiple values are provided for a key. Consider the following markup:

```
<TextPanel UID="TextPanel41">
    Use these buttons to choose a color:
    <Button Uid="Button1" Background="Red">Choose
    red</Button>
    or
    <Button Uid="Button2" Background="Blue"/>Choose
    blue</Button>
<TextPanel/>
```

Notice that the text panel contains both text and nested buttons. Flattened, it appears as below, with the nesting of the buttons represented by the references {Button1}; and {Button2}; in the value of TextPanel41.$Content:

| Key | Value |
|---|---|
| TextPanel41.$Content | Use these buttons to choose a color: {Button1}; or {Button2} |
| Button1.Background | Red |
| Button1.$Content | Choose Red |
| Button2.Background | Blue |
| Button2.$Content | Choose Blue |

Turning to an explanation of the operation and by way of summary, FIGS. 3-6 show the process as the various tools modify the data from its original form into flat files suitable for standard merge comparison.

Figure 3:
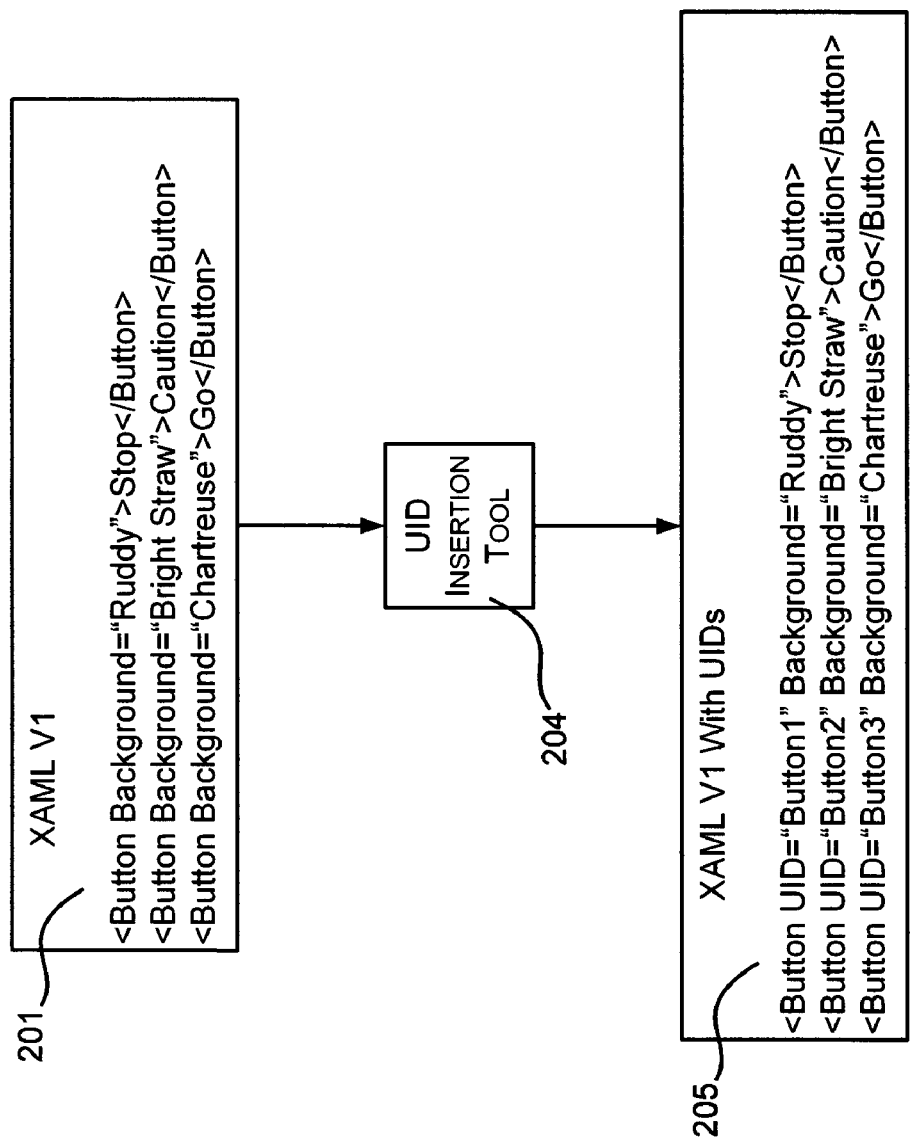
FIGS. 3 and 4 comprise block diagrams generally representing the UID insertion tool operating on example data that is transformed via UID insertion, in accordance with various aspects of the present invention.

In FIG. 3, a first version V1 of the XAML file 201 has the UID insertion tool applied thereto, resulting in the version V1 XAML file with the UIDs added, shown in FIG. 3 as the file 205. This file may be preserved for use at some later time, or may be generated from the previous version on demand.

Figure 4:
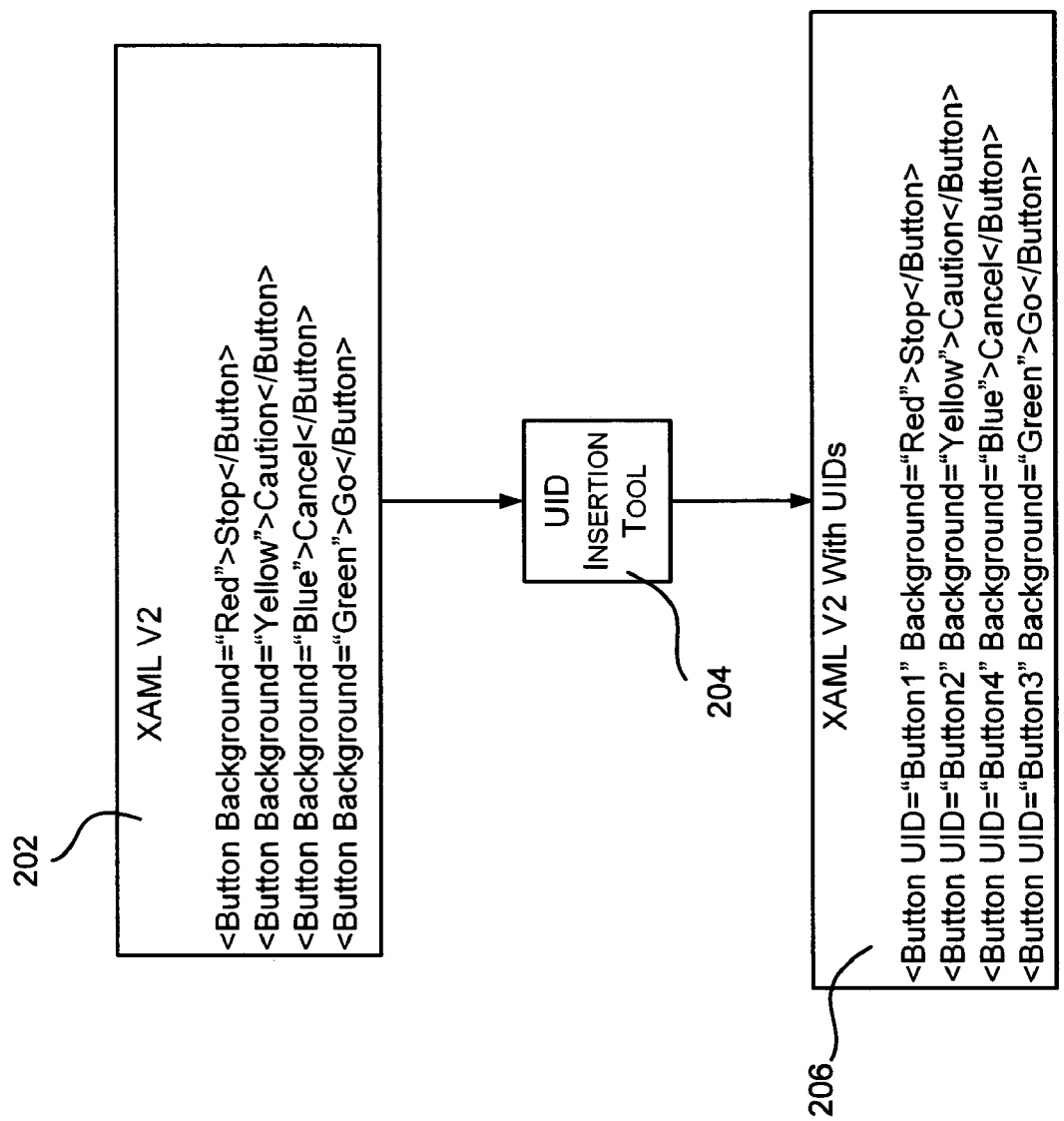

In FIG. 4, the UID insertion tool 204 is applied to the second version, V2, of the XAML file 202, resulting in the version V2 XAML file with the UIDs added, shown in FIG. 4 as the file 206. In general, the UID insertion tool is an XML/XAML parser that walks the file and looks for tags that do not have a UID attribute, and if found, adds a UID attribute that is not used in any previous version that may be compared with this version.

Figure 7:
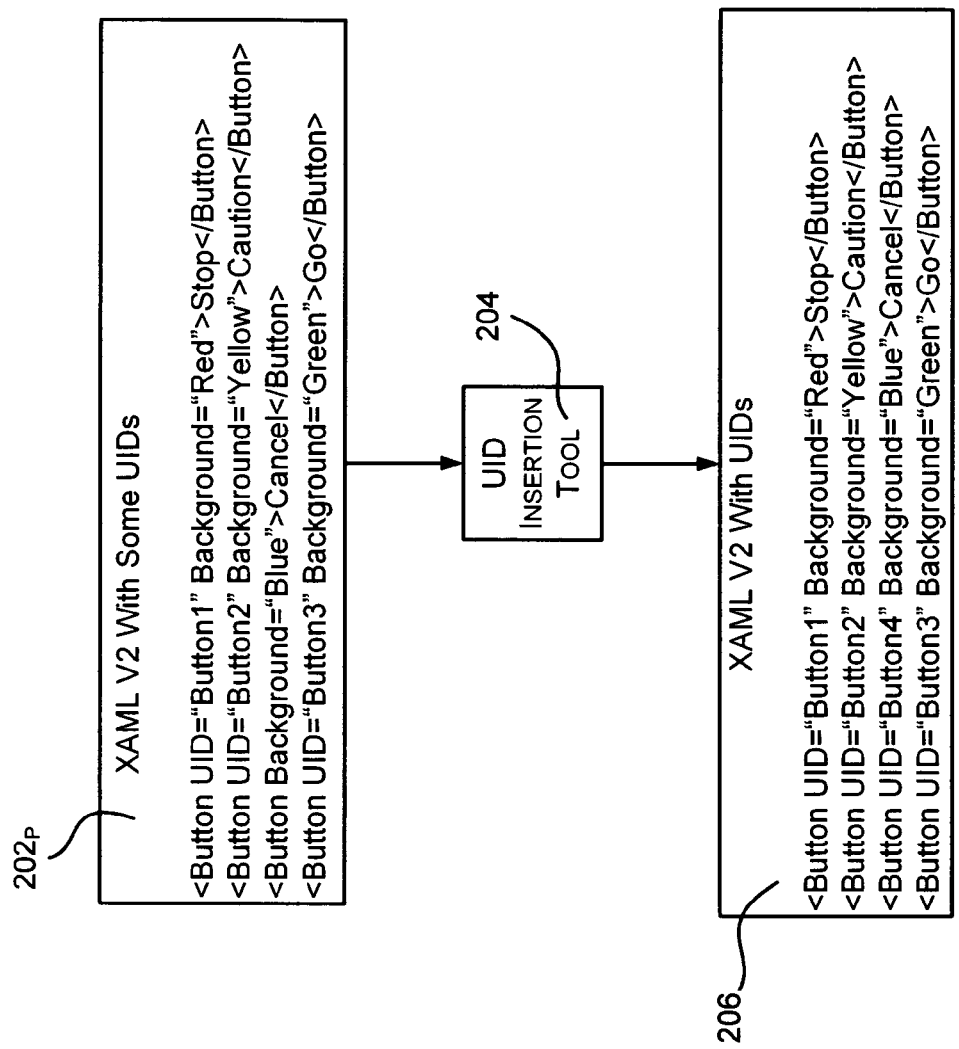
FIG. 7 is a block diagram generally representing the UID insertion tool operating on example data that was previously transformed in part via UID insertion, in accordance with various aspects of the present invention.

FIG. 7 shows such an example, in which changes were made to an already tagged earlier version, resulting in a version $202_P$ (where subscript P represents partial UID) that has some UIDs inserted along with at least one new tag that does not. The earlier UIDs are permanent for the life of their associated tag. In other words, a typical way that changes will be made is by using the technique of FIG. 7, in which changes are made to an already-tagged earlier version, ensuring that earlier-assigned UIDs permanently remain with the markup for the life of the tag.

Typically the comparison is to be performed with only the previous version, and thus the UID insertion tool 204 can scan the previous version's file with UIDs added to locate the UIDs and make sure that they are not reused. However, a database may be maintained in other scenarios, such as if version V1 is to be compared against version V3. Thus, any identifiers that are inserted are unique as well as permanent for that tag, because once added, the insertion tool does not replace the identifier.

Figure 5:
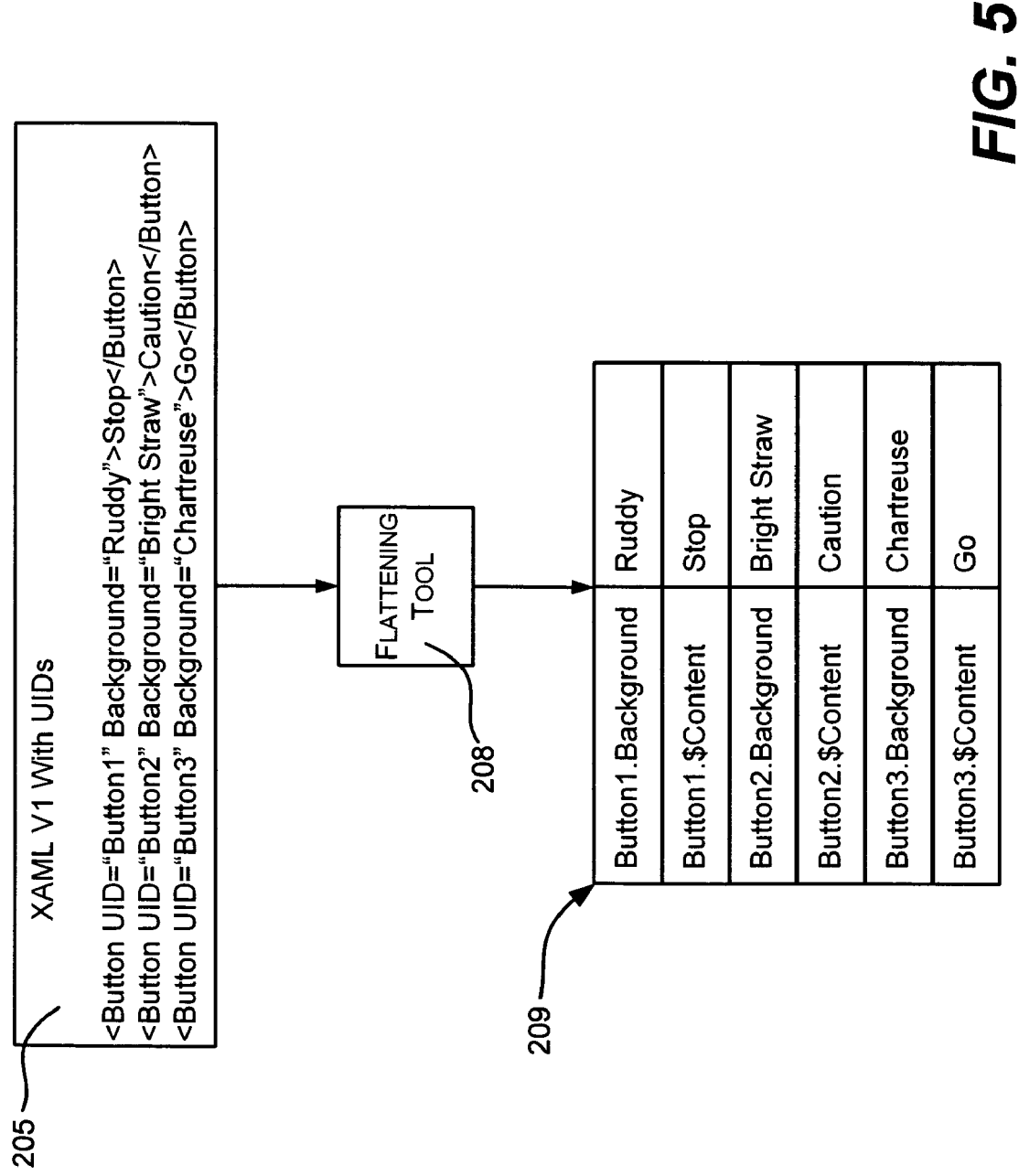
FIGS. 5 and 6 comprise block diagrams generally representing the flattening tool operating on example data to transform hierarchically-arranged data with inserted UIDS into flat files of key-value pairs, in accordance with various aspects of the present invention.
Figure 6:
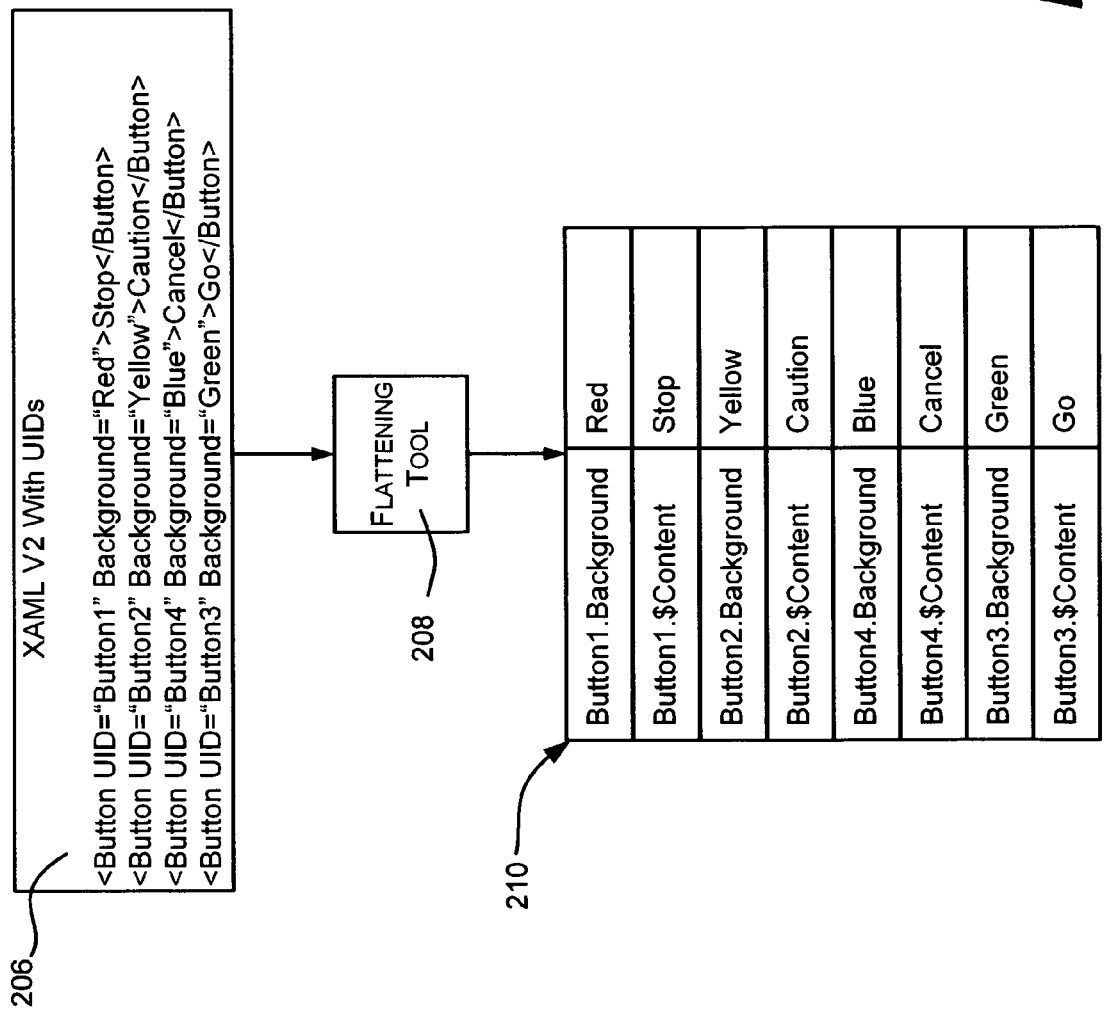

FIG. 5 shows the flattening tool 208 applied to the file 205, that is, the version V1 file that had the UIDs appended to its appropriate tags, resulting in the flat file 209. Note that FIG. 5 shows the flattened color key as Button[#]. Background for syntax in this example, and the flattened text key as Button [#].$Content, (where the bracketed number symbol "[#]" represents the digits one through four that are part of the UIDs in FIGS. 5 and 6). Similarly FIG. 6 shows the result of applying the flattening tool 208 to the V2 file 206, resulting in the flattened key-value pair file 210.

The two resulting flat files 209 and 210 may then be compared by a standard merge comparison tool, resulting in a file having more granular change information than would result from a comparison of the XAML files in their original form. As such, a localization team has a significantly reduced amount of work to do to update a changed file for localization purposes.

Flattening XAML Examples

The below examples show how to flatten XAML, a simple XAML without Property sheet, and markup resource. Note that in these examples, the UID is simply inserted as a number, not a textual description of the tag followed by a number; as mentioned above, this is one alternative implementation.

English Master XAML:

```
<DockPanel
xmlns="using:System.Windows;System.Windows.Controls;
System.Windows.Documents;System.Windows.Presenters"
Background="LightBlue" UID="1">
    <Button DockPanel.Dock="Right" Width="160" Height="100"
Background="Gray" UID="2" >Button Text </Button>
    <DockPanel Background="Yellow" DockPanel.Dock="Top" UID="3">
        <Text UID="4">First Name </Text>
        <Text Background="Red" UID="5">Middle Name </Text>
        <Text UID="6">Last Name</Text>
    </DockPanel>
    <DockPanel Background="Yellow" DockPanel.Dock="Top" UID="7">
        <Text Background="White" UID="8">You will find a <Bold
UID="9">solution</Bold>!</Text>
        <Text Background="White" UID="10">Delete this line!</Text>
    </DockPanel>
</DockPanel>
```

| Flattened XAML: | |
|---|---|
| Key | Value |
| 1.DockPanel.xmlns | Using: . . . |
| 1.DockPanel.Background | LightBlue |
| 1.DockPanel.$Content | {2}{3}{7} |
| 2.Button.DockPanel.Dock | Right |
| 2.Button.Width | 200 |
| 2.Button.Height | 100 |
| 2.Button.Background | Gray |
| 2.Button.$Content | Button Text |
| 3.DockPanel.Background | Yellow |
| 3.DockPanel.Dock | Top |
| 3.DockPanel.$Content | {4}{5}{6} |
| 4.Text.$Content | First Name |
| 5.Text.Background | Red |
| 5.Text.$Content | Middle Name |
| 6.Text.$Content | Last Name |
| 7.DockPanel.Background | Yellow |
| 7.DockPanel.Dock | Top |
| 7.DockPanel.$Content | {8} |
| 8.Text.Background | White |
| 8.Text.$Content | You will find a {9}! |
| 9.Bold.$Content | Solution |
| 10.Text.Background | White |
| 10.Text.$Content | Delete this line! |

Arabic xaml:

```
<DockPanel
xmlns="using:System.Windows;System.Windows.Controls;
System.Windows.Documents;System.Windows.Presenters"
Background="LightBlue" UID="1" Flowdirection="RlTb">
    <Button DockPanel.Dock="Right" Width="160" Height="100"
Background="Blue" UID="2" >Arabic Button Text </Button>
    <DockPanel Background="Yellow" DockPanel.Dock="Top" UID="3">
        <Text UID="6"> Arabic Last Name</Text>
        <Text UID="4"> Arabic First Name </Text>
    </DockPanel>
    <DockPanel Background="Yellow" DockPanel.Dock="Top" UID="7">
        <Text Background="White" UID="8">You will find a
Arabic<Italic UID="9">solution</Italic>!</Text>
    </DockPanel>
</DockPanel>
```

Flattened Arabic xaml (note that the lines in bold italic are changed):

| Key | Value |
|---|---|
| 1.DockPanel.xmlns | Using: . . . |
| 1.DockPanel.Background | LightBlue |
| *1.DockPanel.Flowdirection*  | *RlTb* |
| 1.DockPanel.$Content | {2}{3}{7}{10} |
| 2.Button.DockPanel.Dock | Right |
| 2.Button.Width | 200 |
| 2.Button.Height | 100 |
| *2.Button.Background* | *Blue* |
| *2.Button.$Content* | *Button Text* |
| 3.DockPanel.Background | Yellow |
| 3.DockPanel.Dock | Top |
| *3.DockPanel.$Content* | *{6} {4}* |
| *4.Text.$Content* | *Arabic First Name* |
| *6.Text.$Content* | *Arabic Last Name* |
| 7.DockPanel.Background | Yellow |
| 7.DockPanel.Dock | Top |
| 7.DockPanel.$Content | {8} |
| 8.Text.Background | White |
| 8.Text.$Content | You will find a {9}! |
| 9.Italic.$Content | Solution |

Updated English Master XAML:

```
<DockPanel
xmlns="using:System.Windows;System.Windows.Controls;
System.Windows.Documents;System.Windows.Presenters"
Background="LightBlue" UID="1">
```

-continued

```
<Button DockPanel.Dock="Right" Width="200" Height="100"
Background="Gray" UID="2" >Button Text</Button>
    <DockPanel Background="Yellow" DockPanel.Dock="Top" UID="3">
        <Text UID="4">First Name </Text>
        <Text Background="Red" UID="5">Middle Name </Text>
        <Text UID="6">Last Name</Text>
    </DockPanel>
    <DockPanel Background="Yellow" DockPanel.Dock="Top" UID="7">
        <Text Background="White" UID="8">You will find a <Bold UID="9">solution</Bold>!</Text>
    </DockPanel>
    <DockPanel Background="Yellow" DockPanel.Dock="Top" UID="10">
        <Text Background="White" UID="11">Add a new line!</Text>
    </DockPanel>
</DockPanel>
```

Flattened xaml (note that the lines in bold italic are changed):

| Key | Value |
| --- | --- |
| 1.DockPanel.xmlns | Using: . . . |
| 1.DockPanel.Background | LightBlue |
| 1.DockPanel.$Content | {2}{3}{7}{10} |
| 2.Button.DockPanel.Dock | Right |
| 2.Button.Width | 200 |
| 2.Button.Height | 100 |
| 2.Button.Background | Gray |
| 2.Button.$Content | Button Text |
| 3.DockPanel.Background | Yellow |
| 3.DockPanel.Dock | Top |
| 3.DockPanel.$Content | {4}{5}{6} |
| 4.Text.$Content | First Name |
| 5.Text.Background | Red |
| 5.Text.$Content | Middle Name |
| 6.Text.$Content | Last Name |
| 7.DockPanel.Background | Yellow |
| 7.DockPanel.Dock | Top |
| 7.DockPanel.$Content | {8} |
| 8.Text.Background | White |
| 8.Text.$Content | You will find a {9}! |
| 9.Bold.$Content | Solution |
| *10.DocPanel.Background* | *Yellow* |
| *10.DockPanel.Dock* | *Top* |
| *10.DockPanel.$Content* | *{11}* |
| *11.Text.Background* | *White* |
| *11.Text.Content* | *Add a new line!* |

CONCLUSION

As can be seen from the foregoing detailed description, there is provided a method and system that enable standard merge comparison tools to provide difference information that is granular even when complex changes have been made to data files such as XML and XAML files. The tools insert permanent UIDs and flatten the files for comparison, providing significant benefits and advantages needed in contemporary computing, such as for localization purposes.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
    accessing a hierarchically arranged data file containing hierarchically arranged data, the hierarchically arranged data including a plurality of data elements, at least some of the data elements containing one or more nested attribute name/value pairs;
    automatically modifying the accessed hierarchically arranged data file to configure the accessed hierarchically arranged data file for more efficient comparison to data from other versions of the hierarchically arranged data file, the accessed hierarchically arranged data file modified by adding a unique identifier to at least one of the data elements within the hierarchically arranged data of the hierarchically arranged data file, including:
        determining in a first determination that some, but not all, of the data elements of the hierarchically arranged data file are not to be localized;
        based on the first determination:
            omitting establishing a unique identifier for those data elements that are not to be localized; and
            omitting nesting a unique identifier attribute name/value pair within those data elements that are not to be localized; and
        determining in a second determination that some, but not all, of the data elements of the hierarchically arranged data file are to be localized;
        based on the second determination:
            establishing a corresponding unique identifier value for those data elements that are to be localized; and
            nesting a unique identifier attribute name/value pair within those data elements that are to be localized, the unique identifier attribute name/value pair including a name portion and a value portion, the name portion identifying the unique identifier attribute name/value pair as a unique identifier attribute for the data element and the value portion indicating that the value of unique identifier attribute is the corresponding established unique identifier value; and
    storing the modified data file, including any nested unique identifier attribute name/value pairs, for subsequent access so that any changes to the data file can be more efficiently detected when data from the modified data file is compared to data from another version of the data file.

2. The method of claim 1 wherein establishing a corresponding unique identifier for the data element comprises determining whether the data already has a unique identifier attribute name/value pair.

3. The method of claim 1 wherein automatically modifying the accessed data file to configure the accessed data file for more efficient comparison to data from other versions of the data file comprises determining which data elements need to be uniquely identified.

4. The method of claim 1 wherein automatically modifying the accessed data file to configure the accessed data file for more efficient comparison to data from other versions of the data file comprises configuring the accessed data file for conversion to a flat file format, the flat file format representing attribute name/value pairs as unnested records.

5. The method of claim 4 further comprising subsequent to storing the modified data file:
    accessing the stored modified data file;
    creating a second file for storing records in a flat file format;
    for each data element in the stored modified data file that includes a nested unique identifier attribute name/value pair:

accessing from within the data element a nested attribute name/value pair other than the unique identifier attribute name/value pair;

unnesting the accessed attribute name/value pair from the hierarchically arranged data;

converting the accessed attribute name/value pair into a record in the flat file format, the record indicative of the association with the established corresponding unique identifier value nested within the data element inserting the record into the second file; and storing the second file to facilitate more efficient comparison to data from other versions of the data file.

6. The method of claim 5 farther comprising subsequently detecting differences between the second file and a third file, the third file storing records in the flat file format, the records representing accessed attribute name/value pairs from another different version of the data file containing hierarchically arranged data.

7. The method of claim 6 wherein detecting differences comprises submitting the second and third files in the flat file format to a standard text-based merge tool that outputs records for each change that may be flagged with deleted, new or changed content flags.

8. The method of claim 6 wherein detecting differences comprises evaluating records in the second file corresponding records in the third file, corresponding items between the second and third file identified at least by association to a common established corresponding unique identifier value.

9. The method of claim 1 wherein the hierarchically-arranged file comprises an extensible markup language (XML) file.

10. The method of claim 1 wherein the hierarchically-arranged file comprises an extensible application markup language (XAML) file.

11. One or more recordable-type computer-readable media having computer-executable instructions which when executed perform the method of claim 1.

12. A computer program product for use at a computer system, the computer program product for implementing a method for detecting differences between data files, the computer program product comprising at least one physical, recordable-type computer-readable medium having stored thereon computer-executable instructions that, when executed by a processor, cause the computer system to perform the method, including the following:

accessing a first flat file in a flat file format, the first flat file having been generated from first hierarchical data contained in a first version of a hierarchically arranged data file localized in accordance with a first localization, at least some elements in the first hierarchically arranged data including a nested unique identifier attribute name/value pair indicating that other nested attribute name/value pairs in the elements are associated with a unique identifier value, the first flat file containing records in the flat format that persist an association to unique identifier values nested within the corresponding first hierarchical arranged data elements from which they were derived;

accessing a second flat file in the flat file format, the second flat file having been generated from second hierarchical data contained in a second, edited version of the hierarchically arranged data file localized in accordance with the first localization, at least some elements in the second hierarchically arranged data including a nested unique identifier attribute name/value pair indicating that other nested attribute name/value pairs in the elements are associated with a unique identifier value, the second flat file containing records in the flat format that persist an association to unique identifier values nested within the corresponding second hierarchical arranged data elements from which they were derived;

comparing the records in the first flat file to the records in the second flat file;

detecting differences between records in the first flat file and records in the second flat file, each detected difference indicative of a difference between nested attribute name/value pairs in the first hierarchically arranged data and in the second hierarchically arranged data;

outputting a difference file from the comparison of the first and second flat files that flags the detected differing records, the difference file usable to refer back to data differences between the first version of the hierarchically arranged data file and the second version of the hierarchically arranged data file; and localizing those portions of the data file identified in the difference file in accordance with a second different localization for inclusion in a third version of the hierarchically arranged data file localized in accordance with the second different localization such that edits to the hierarchically arranged data file localized in accordance with the first localization can be more efficiently integrated into the third version of the hierarchically arranged data file.

13. The computer program product of claim 12 wherein the second hierarchically arranged data file is a later version of the first hierarchically arranged data file.

14. The computer program product of claim 12 wherein the hierarchically arranged data file comprises an extensible markup language (XML) file.

15. The computer program product of claim 12 wherein the second hierarchically arranged data file comprises an extensible application markup language (XAML) file.

16. In a computing environment, a computer system comprising:

one or more processors;

system memory; and one or more recordable-type computer-readable medium having stored thereon computer-executable instructions representing an insertion tool and having stored thereon computer-executable instructions representing a flattening tool, wherein the insertion tool is configured to:

access a hierarchically arrange data file containing a first version of hierarchically arranged data, the first version of the hierarchically arranged data including a plurality of data elements, at least some of the data elements containing one or more nested attribute name/value pairs;

automatically modify the accessed data file to configure the accessed data file for more efficient comparison to data from other versions of the data file, the accessed data file modified by adding a unique identifier to at least one of the data elements within the first version of the hierarchically arranged data of the data file, including:

determine in a first determination that some, but not all, of the data elements of the hierarchically arranged data file are not to be localized;

based on the first determination:

omit establishing a unique identifier for those data elements that are not to be localized; and omit nesting a unique identifier attribute name/value pair within those data elements that are not to be localized; and determine in a second determination that some, but not all, of the data elements of the hierarchically arranged data file are to be localized;
based on the second determination:
   establish a corresponding unique identifier value for those data elements that are to be localized; and
   nest a unique identifier attribute name/value pair within those data elements that are to be localized, the unique identifier attribute name/value pair including a name portion and a value portion, the name portion identifying the unique identifier attribute name/value pair as a
   unique identifier attribute for the data element and the value portion indicating that the value of unique identifier attribute is the corresponding established unique identifier value; and
store the modified data file, including any nested unique identifier attribute name/value pairs, for subsequent access so that any changes to the data file can be more efficiently detected when data from the modified data file compared to data from another version of the data file; and,
wherein the flattening tool is configured to:
access the stored modified data file;
create a second file for storing records in a flat file format;
for each data element in the stored modified data file that includes a nested unique identifier attribute name/value pair:
   access from within the data element a nested attribute name/value pair other than the unique identifier attribute name/value pair;
   unnest the accessed attribute name/value pair from the first version of the hierarchically arranged data;
   convert the accessed attribute name/value pair into a record in the flat file format, the record indicative of the association with the established corresponding unique identifier value nested within the data element; and
   insert the record into the second file; and
store the second file to facilitate more efficient comparison to data from other versions of the data file.

17. The system of claim 16 further comprising one or more recordable-type computer-readable medium having stored thereon computer-executable instructions representing a comparison tool, wherein the comparison tool is configured to:
access the second file;
access a third file in the flat file format, the third flat file having been generated from second hierarchical data contained in the second, edited version of the hierarchically arranged data file localized in accordance with the first localization, at least some elements in the second hierarchically arranged data including a nested unique identifier attribute name/value pair indicating that other nested attribute name/value pairs in the elements are associated with a unique identifier value, the third flat file containing records in the flat format that persist an association to unique identifier values nested within the corresponding second hierarchical
arranged data elements from which they were derived;
compare the records in the second flat file to the records in the third flat file; detect differences between records in the second file and records in the third file, each detected difference indicative of a difference between nested attribute name/value pairs in the first version of the hierarchically arranged data and in the second version of the hierarchically arranged data;
output a difference file from comparisons of the second and third flat files that flags the detected differing records, the difference file usable to refer back to data differences between the first version of the hierarchically arranged data file and the second version of the hierarchically arranged data file; and
localizing those portions of the data file identified in the difference file in accordance with a second different localization for inclusion in a third version of the hierarchically arranged data file localized in accordance with the second different localization such that edits to the hierarchically arranged data file localized in accordance with the first localization can be more efficiently integrated into the third version of the hierarchically arranged data file.

18. The system of claim 16 wherein record include a text string that describes the a data element and a number that is unique for that text string.

19. The system of claim 16 wherein the hierarchically arranged data files comprise extensible markup language (XML) files.

20. The system of claim 16 wherein the hierarchically arranged data files comprise extensible application markup language (XAML) files.

* * * * *